（12） United States Patent
Robertson et al.

(10) Patent No.: US 8,650,736 B2
(45) Date of Patent: Feb. 18, 2014

(54) DISPENSER FOR VISCOUS CONDIMENTS

(75) Inventors: Ronald D. Robertson, Kansas City, MO (US); Wayne F. Schneider, Olathe, KS (US)

(73) Assignee: Huhtamaki, Inc., De Soto, KS (US)

( * ) Notice: Subject to any disclaimer, the term of this patent is extended or adjusted under 35 U.S.C. 154(b) by 0 days.

(21) Appl. No.: 13/416,630

(22) Filed: Mar. 9, 2012

(65) Prior Publication Data
US 2012/0223128 A1 Sep. 6, 2012

Related U.S. Application Data

(62) Division of application No. 11/836,555, filed on Aug. 9, 2007, now Pat. No. 8,146,781.

(51) Int. Cl.
*B23P 11/00* (2006.01)
*G01F 11/00* (2006.01)

(52) U.S. Cl.
USPC ............. 29/428; 222/490; 222/327; 222/387; 222/494; 222/386

(58) Field of Classification Search
USPC ......... 222/490, 494, 326, 327, 386, 387, 212; 229/5.5; 425/190; 493/109; 137/845, 137/849; 215/232; 29/428
See application file for complete search history.

(56) References Cited

U.S. PATENT DOCUMENTS

| | | | |
|---|---|---|---|
| 2,776,787 A | 1/1957 | Nicol | |
| 3,238,869 A * | 3/1966 | West et al. | 101/228 |
| 3,369,726 A | 2/1968 | Wilcox | |
| 3,884,396 A | 5/1975 | Gordon et al. | |
| 4,047,473 A * | 9/1977 | Fletcher et al. | 493/108 |
| 4,122,790 A * | 10/1978 | Rowe et al. | 53/411 |
| 4,135,347 A | 1/1979 | Lowdermilk | |
| 4,269,330 A | 5/1981 | Johnson | |
| 4,356,935 A | 11/1982 | Kamin | |
| 4,373,646 A * | 2/1983 | MacEwen | 222/327 |
| 4,397,401 A | 8/1983 | Ueno et al. | |
| 4,432,473 A | 2/1984 | MacEwen | |
| 4,722,447 A | 2/1988 | Crisci | |
| 4,830,231 A | 5/1989 | Smith | |
| 4,934,570 A | 6/1990 | Bamberger et al. | |
| 5,340,421 A * | 8/1994 | Shea et al. | 156/69 |
| 5,591,468 A | 1/1997 | Stockley, III et al. | |
| 5,683,659 A * | 11/1997 | Hovatter | 422/548 |

(Continued)

FOREIGN PATENT DOCUMENTS

| | | |
|---|---|---|
| CN | ZL 03804798.5 | 5/2007 |
| WO | 03059784 A1 | 7/2003 |

*Primary Examiner* — Essama Omgba
(74) *Attorney, Agent, or Firm* — Husch Blackwell LLP

(57) ABSTRACT

A dispenser for viscous condiments including a tubular sidewall having opposite ends. One opposite end is open and can receive a plunger or piston therein for applying force to a condiment contained within the tubular sidewall. The other end of the sidewall includes a dispenser valve assembly including a member secured to an inturned flange portion of the sidewall with the flange portion being generally normal to the sidewall. The dispenser valve assembly is suitably secured to the flange portion as by heat sealing, such as a bead of hot melt, to form a composite laminated structure that is resistant to the penetration of liquid elements of the condiments. The dispenser valve assembly further includes a valve plate having one or more selectively openable discharge openings that will open and close under the influence of the pressure applied to the condiment in order to discharge the condiment.

2 Claims, 3 Drawing Sheets

(56) References Cited

U.S. PATENT DOCUMENTS

| | | | |
|---|---|---|---|
| 5,776,284 A * | 7/1998 | Sykes et al. | 156/252 |
| 5,976,655 A * | 11/1999 | Sykes | 428/40.1 |
| 6,042,862 A | 3/2000 | Kocher et al. | |
| 6,047,878 A | 4/2000 | Lowry | |
| 6,115,993 A * | 9/2000 | O'Donnell | 53/389.4 |
| 6,174,274 B1 * | 1/2001 | Hawkins et al. | 493/77 |
| 6,361,485 B1 | 3/2002 | Robertson | |
| 6,371,335 B1 | 4/2002 | MacEwen | |
| 6,413,604 B1 * | 7/2002 | Matthews et al. | 428/40.1 |
| 6,461,714 B1 * | 10/2002 | Giles | 428/126 |
| 6,474,490 B1 | 11/2002 | Seibel et al. | |
| 6,544,613 B1 | 4/2003 | Varadarajan | |
| 6,635,137 B2 * | 10/2003 | Giles | 156/226 |
| 6,655,554 B2 | 12/2003 | Pantelleria et al. | |
| 6,802,919 B2 | 10/2004 | Massey et al. | |
| 6,858,108 B2 * | 2/2005 | Matthews et al. | 156/256 |
| 6,881,286 B2 | 4/2005 | Drummond et al. | |
| 6,908,001 B2 | 6/2005 | Moore | |
| 6,986,930 B2 * | 1/2006 | Giles | 428/119 |
| 7,160,412 B2 * | 1/2007 | Baumli | 156/256 |
| 7,419,559 B2 * | 9/2008 | Giles | 156/226 |
| 7,959,038 B2 * | 6/2011 | de Oliveira et al. | 222/327 |
| 8,146,781 B2 * | 4/2012 | Robertson et al. | 222/327 |
| 2002/0084026 A1 * | 7/2002 | Matthews et al. | 156/267 |
| 2002/0176178 A1 * | 11/2002 | Giles | 359/753 |
| 2003/0039786 A1 * | 2/2003 | Milliorn et al. | 428/40.1 |
| 2004/0177931 A1 * | 9/2004 | Baumli | 156/539 |
| 2004/0247812 A1 * | 12/2004 | Milliorn et al. | 428/41.8 |
| 2008/0073308 A1 * | 3/2008 | Yousif | 215/232 |

* cited by examiner

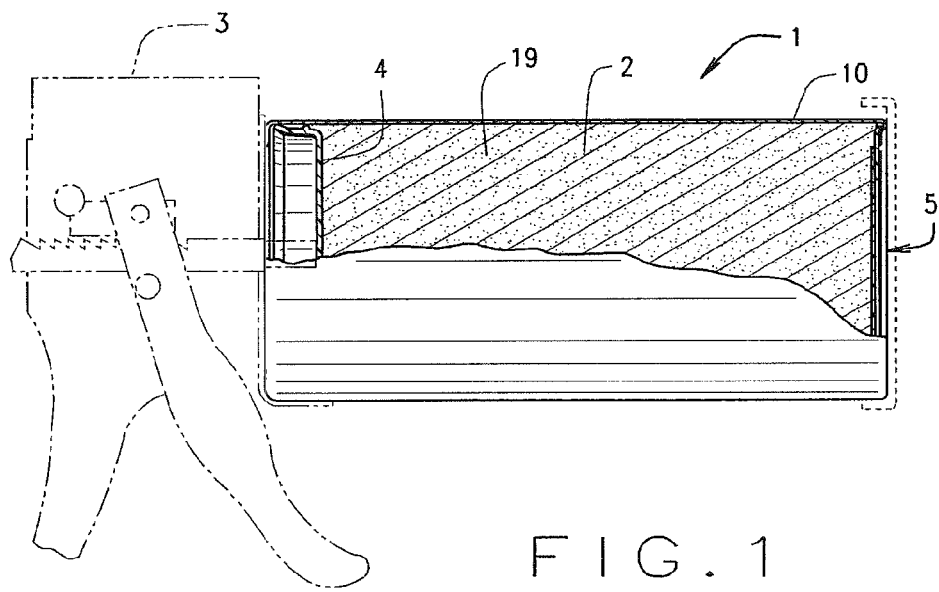
FIG. 1
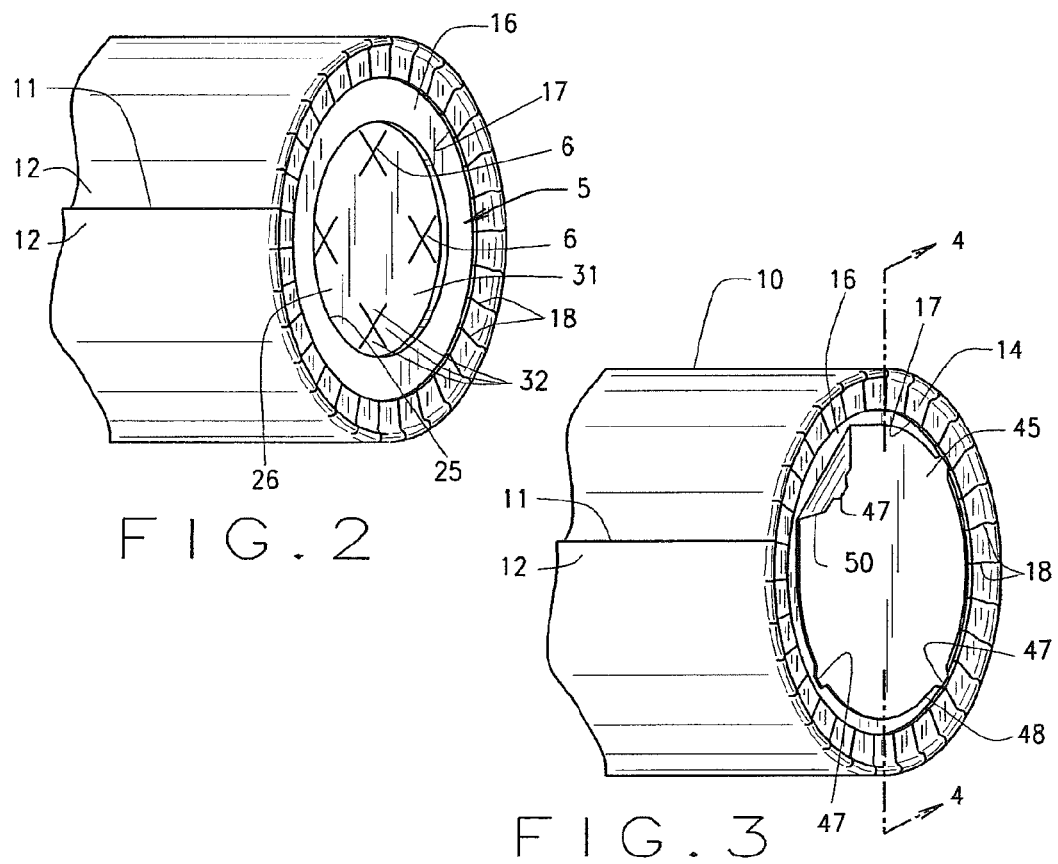
FIG. 2
FIG. 3

DISPENSER FOR VISCOUS CONDIMENTS

CROSS-REFERENCE TO RELATED APPLICATIONS

This Application is a Divisional of and claims priority to U.S. application Ser. No. 11/836,555 filed Aug. 9, 2007 to Ronald D. Robertson and Wayne F. Schneider entitled "Dispenser For Viscous Condiments," which issued as U.S. Pat. No. 8,146,781 on Apr. 3, 2012, the entire disclosure of which is hereby incorporated by reference to the extent permitted by law.

BACKGROUND OF INVENTION

The dispensing of viscous condiments, e.g., mustard, ketchup, mayonnaise, sandwich spreads and the like, is commonly done in restaurants. In order to handle the volume throughput requirements in restaurant kitchens, devices have been constructed for dispensing such condiments from tubes (packages) with the assistance of mechanical pump-type devices. Such devices are similar in construction to caulking guns. An example of such a device may be found in U.S. Pat. No. 4,830,231. While such devices have been effective, they do have some shortcomings.

It is desirable to eliminate material from the tubes that is not necessary. Even a small amount of material savings in a container can result in significant cost savings because of the large quantity required by restaurants, particularly in the fast food industry. However, to eliminate material, new assembly techniques may be needed necessitating new manufacturing equipment which adds again to the expense of the containers. Additionally, when viscous materials are contained in a container it is highly desirable to impede the migration of liquids such as water and lipids (fats) into the container material when such container material includes paperboard which can absorb and transfer such liquids by wicking. The absorption of such liquids can cause a detrimental appearance to the package and may even cause its unnecessary disposal. Typically, a condiment dispenser, such as that shown in the above-identified patent, was assembled using hot melt adhesives to join various container portions at the discharge end thereof. It would be desirable to reduce or eliminate this use of hot melt adhesive as a major element providing structural integrity to the package. Hot melt can cause detrimental generation of steam from moisture contained in various packaging components, particularly paperboard during assembly. The steam can cause problems such as forming tiny bubbles and/or holes through the hot melt thereby permitting oil and moisture to pass into raw edges of the paperboard tube. Thus, the tube (package) may become saturated, soften and begin to fall apart.

It is therefore desirable to provide an improved condiment dispenser. It is also desirable to provide an improved dispenser that has a reduction in the materials used and a reduction in the cost to manufacture.

SUMMARY OF INVENTION

The present invention relates to a container usable as a dispenser for use with viscous flowable condiments. The container includes a sidewall that is generally tubular forming a storage compartment for a viscous condiment. The sidewall has opposite ends, one of which is preferably open for receipt of a piston therein. The piston can be used to apply force to the condiment within the container to induce dispensing. The other end of the container is a normally closed end having a dispensing valve assembly. The dispensing valves are located on a valve plate secured to a mount plate which is secured to an inturned flange formed as part of the sidewall. The sidewall may be a convolute formed tube with a longitudinal seam. A removable membrane cover may be secured over the dispensing valve assembly which will provide a tamper-evident seal. The membrane cover is attached to the dispensing valve assembly before the valve assembly is attached to the sidewall. A die may be used to cut the perimeter shape of the membrane cover so that it precisely fits within an opening formed by the inturned flange. A portion of the membrane cover may be reverse bent to provide for gripping and subsequent removal of the cover. The dispensing valve assembly may be secured to the inturned generally flat flange and have an outer exposed edge portion engaging a hot melt material to cover all or substantially all of the exposed edge. Preferred materials for the sidewall and a portion of the dispensing valve assembly are paperboard and can have a polymer coating thereon to help effect resistance to penetration by liquids, and to help effect the joining of various components to one another as by heat sealing.

BRIEF DESCRIPTION OF DRAWINGS

FIG. 1 is a side elevation view of a condiment dispenser shown partially in section and held by a dispensing gun in accordance with one embodiment of the present invention;

FIG. 2 is a fragmentary perspective view of the dispensing end of the condiment dispenser in accordance with one embodiment of the present invention;

FIG. 3 is a view similar to FIG. 2 but with a peel-off closure member covering the dispensing openings;

The same numbers used throughout the various figures designate like or similar parts and/or structure as described herein.

DETAILED DESCRIPTION

Figure 4:
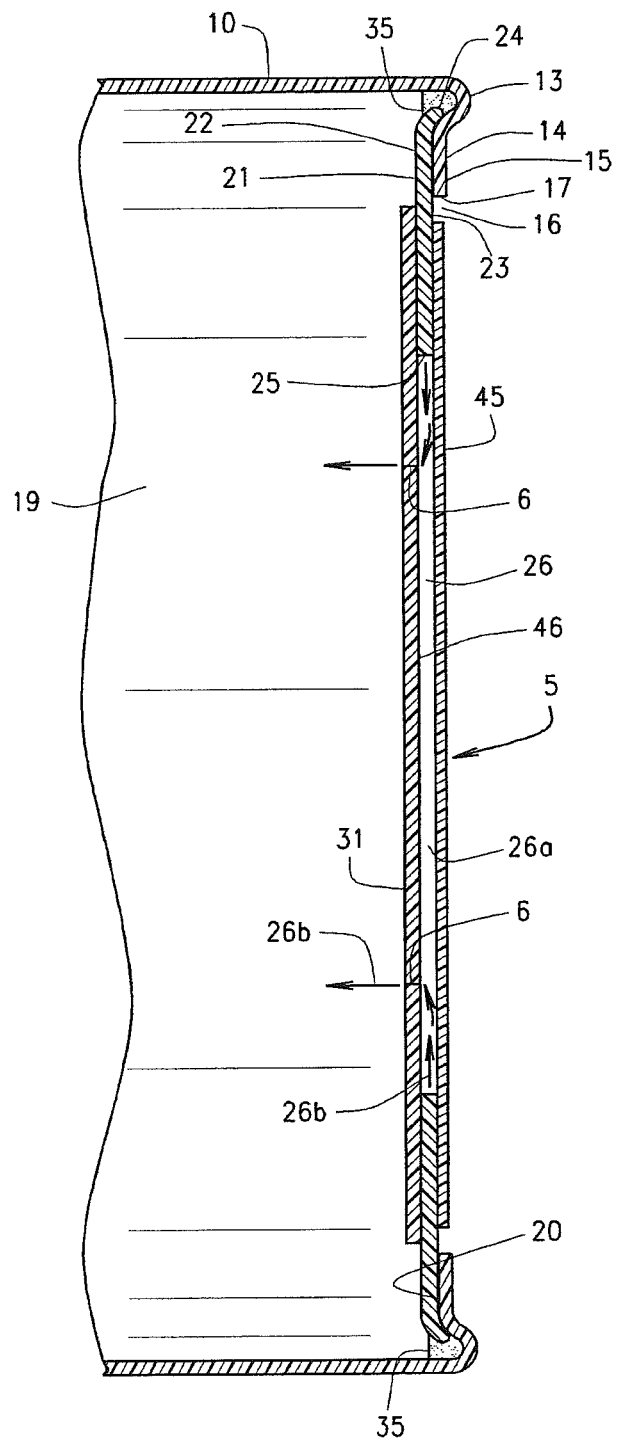
FIG. 4 is an enlarged fragmentary sectional view of the dispensing end of FIG. 3 in accordance with one embodiment of the present invention.
Figure 5:
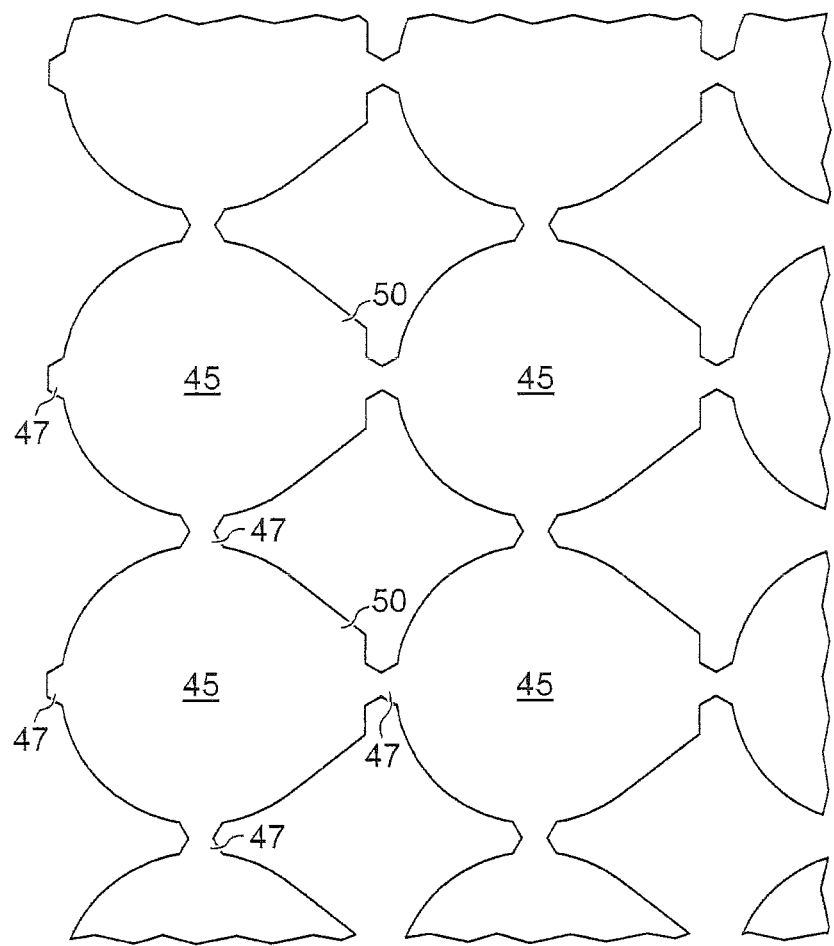
FIG. 5 is a fragmentary top view of a web of covers that are partially die cut and interconnected together via their ears prior to their securement to a valve assembly in accordance with one embodiment of the present invention.

The reference numeral 1 designates generally a condiment dispenser for use in the storage and dispensing of viscous condiments 2 such as ketchup, mustard, mayonnaise, sandwich spread and the like. Such condiments 2 can be water and/or lipid based. In a preferred embodiment, the condiment dispenser 1 includes a feed device 3 that may be in the form of a trigger gun for use in applying force to a piston 4 which will in turn pressurize the condiment 2 for dispensing through a dispenser valve assembly 5 having one or more dispensing openings 6. During dispensing, the piston 4 moves toward the valve assembly 5. The feed device 3 can be manually operated for example by having a trigger or may be power operated for example by having an electric motor-driver actuator. Preferably, the feed device 3 is easily sanitized as by washing without detriment to the feed device.

The condiment dispenser 1 includes a sidewall 10 that may be formed of a polymeric-coated paperboard having a longitudinal seam 11 formed by overlapping edge margin portions 12 which may be secured together as by heat sealing of the polymeric coating. Preferably, the paperboard of the sidewall 10 has a thickness suitable to contain the condiment in storage and under dispensing pressure. The polymeric coating may be polyethylene or the like as are known in the art. Seam 11 may be formed as by heat sealing edge margins 12 as is also known in the art. The sidewall 10 has an inturned flange portion 14 which has a significant portion thereof generally perpendicular to the sidewall 10 and relatively flat. The flange 14 has an outer face 15 and an opening 16 which is defined by an internal edge 17. The outer face 15 of the flange 14 is flush to slightly below flush with the free end 13 of the sidewall 10, e.g. about 3/16 inch or less. Preferably the opening 16 is generally round as best seen in FIGS. 2, 3. When the flange 14 is formed, a plurality of pleats 18 may occur which can be easily accommodated by subsequent assembly steps as described below. The pleats 18 add rigidity to the flange 14. Flange 14 may be formed by a roll forming process and may be held in its formed position by attachment to the valve assembly 5.

The valve assembly 5 closes one end of the chamber 19 formed by sidewall 10 and is adapted for the selective release of condiment 2 from the chamber 19. In the illustrated structure, the valve assembly 5 is secured in covering relation to the opening 16 and is preferably secured to an inside face 20 of the flange 14. As shown in FIG. 4, the valve assembly 5 includes a mount plate 21 in the form of an annular ring or disk having opposite side faces 22, 23, an outer perimeter edge 24 and an inner edge 25 defining a through opening 26. Preferably, the opening 26 is in axial alignment with the opening 16 providing communication between the chamber 19 and the exterior of the dispenser 1.

A slitted valve plate 31 is attached to the mount plate 21 preferably by securement to the face 22. The valve plate 31 is preferably located on the interior side of the plate 21. In a preferred embodiment, the valve plate 31 is in the form of a polymeric sheet, for example, low density polyethylene, having a plurality of the dispensing openings 6 in the form of die cut slits which can be in the form of an X for each opening. When the condiment 2 is pressurized by force applied to the piston 4, flaps 32 formed by the X die cut slit will resiliently move outwardly allowing openings 6 to be exposed in the plate 31 for the condiment to flow through. During dispensing, the piston 4 moves along the chamber 19 toward the valve assembly 5. When pressure is relieved, the flaps 32 move back to a closed or partially closed position. As shown, the plate 31 is secured to the face 22 as by heat bonding. In a preferred embodiment, the plate 21 is polymeric-coated paperboard element allowing heat bonding of the plate 21 to the flange 14 and to the valve plate 31. The openings 6 are positioned inside or inwardly of the edge 25. One or more openings 6 may be provided albeit four are shown in FIG. 2.

As seen in FIG. 4, the edge 24 of the plate 21 is sealed by a bead of hot melt 35. Typically, during assembly of paperboard items, the paperboard will contain a certain amount of moisture. When the paperboard is heated, for example, during the application of hot melt or via the heat sealing process to join parts or areas together, the water in the paperboard will turn to steam and migrate out of the paperboard when possible. In the present invention, the openings 6 may be used as a steam vent should same be produced in the plate 21 during the application of hot melt as a caulking agent.

It should be pointed out that since plates 21 and 31 along with sidewall 10, flange 14 and valve plate 31 all have polyethylene (or the like) coated surfaces, they can be heat welded together thereby eliminating the need for a hot melt to act as a structural component. Typically, when the paperboard elements are formed, they are die cut leaving "rough" edges that are uncoated. Such edges provide a means for ingress and egress of liquid vapor into the paperboard matrix. As best seen in FIG. 4, a bead of hot melt 35 is applied proximate the edge 24 of plate 21, the sidewall 10, and flange 14. It has been found that this hot melt functions primarily to seal the package and since the structural integrity is accomplished via the heat welding of the poly coated surfaces, rather than via hot melt, less hot melt is required and it may be of a less complex nature. Thus, the package is inherently stronger and less expensive to construct.

A cover 45 in the form of a membrane may be provided to selectively close the openings 6 for storage and shipping of the dispenser 1. The cover 45 may be adhesively secured the outer surface 23 of plate 21 in overlying relation to the openings 6. The cover 45 may be in the form of a polymeric-coated paper element or may be a polymeric material. It is preferred that the cover 45 be resistant to penetration by liquids. With the construction of the package as described above, when the hot melt is applied as shown and described with respect to FIG. 4, the air tight seal between plate 21 and cover 45 closes off the escape route of steam to the outside. But for the construction of the present invention, the pressure of the steam would be high enough that it would pass through the hot melt rendering the hot melt caulking ineffective because oil and moisture then could pass into the raw edge 24 and saturate the paper and damage the integrity of the package. It is preferred that there be an air gap 26a between at least a portion of the cover membrane 45 and the outer surface 46 of the valve disk 31 to provide for the release of steam should any be generated in the plate 21 during and shortly after the application of the hot melt 35. This gap 26a would allow for steam, if steam is generated, to move in the direction of the arrows 26b and be discharged through the opening 6 into the chamber 19. FIG. 4 shows the steam's path 26b as it exits plate 21. Steam can exit plate 21 through edge 25. Upon exiting edge 25 of plate 21, the steam enters air gap 26a. Once the steam is in air gap 26a, it can then exit into chamber 19 and the atmosphere through openings 6.

As shown in FIG. 3, the cover 45 has a plurality of circumferentially spaced ears 47 projecting from an outer perimeter 48 thereof. The cover 45 also includes a tab portion 50 having an ear 47. FIG. 4 is a sectional view of FIG. 3 taken about line 4-4. Therefore, neither the ears 47 nor the tab 50 are depicted in FIG. 4. However, both the ears 47 and the tab 50 can be seen in FIG. 3.

Preferably, during the manufacturing of valve assembly 5, a plurality of covers 45 are included in a web made from a single piece of material. In the web, the covers 45 are partially die cut and interconnected together via their ears 47. The valve assembly 5 may be appropriately aligned with a respective cover 45 in the web. Once the dispenser 1 is aligned with a cover 45, the cover 45 may be bonded to the plate 21. As shown, the bonding of the cover 45 to the plate 21 can take place in the annular ring area on surface 23 defined edges 17 and edge 25. It will be appreciated by one skilled in the art that one bonding method includes heat bonding cover 45 to plate 21. After the cover is bonded to the plate 21, the final die cutting of the cover form the web can be accomplished by cutting the ears 47. Once the ears 47 are cut, the cover 45 is completely detached from the web.

As mentioned above, the cover 45 has a tab portion 50. Tab portion 50 provides the user a place to grip the cover 45 to assist in its removal from the valve assembly 5. After the cover 45 is bonded to the valve assembly 5, but before the valve assembly 5 is secured to sidewall 10, tab portion 50 may be folded back toward the outer surface of cover 45. The folding of tab portion 50 allows surface 23 of plate 21 to be directly mated to the inner face 20 of flange 14 without the tab portion 50 interfering. If tab portion 50 were not folded, it could extend into the seal created between surface 23 and face 20. This could prevent the proper sealing of plate 21 to sidewall 10. Additionally, it would prevent the cover 45 from being removed from the dispenser 1 because the tab portion 50 of cover 45 would be permanently sealed between surface 23 and face 20. It will be appreciated by one skilled in the art that a tab portion 50 that is ¾" long by ⅜" wide is sufficient.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

We claim:

1. A method of making a condiment dispenser comprising:

forming a tubular housing having first and second end portions, said first end portion having an inwardly extending flange;

forming a support member having first and second opposing surfaces, raw inner and outer edges and a through opening defined by said inner edge;

forming a perforate member with at least one dispensing opening;

attaching said perforate member to said second surface of said support member to form a dispensing valve assembly;

forming a web containing a plurality of seal members, said seal members connected to one another in the web by ear portions;

aligning one of said seal members with said support member;

attaching the aligned seal member to said first surface of said support member thereby resulting in an air gap between said perforate member and said seal member;

severing the attached seal member from said web;

positioning said dispensing valve assembly such that the outer edge of the support member is adjacent an inside surface of said tubular housing; and applying a bead of hot melt adhesive proximate said support member outer edge and said tubular housing for sealing said support member outer edge;

wherein said support member inner edge is adapted such that any steam created within said support member during the application of said hot melt adhesive to said support member outer edge may migrate out of said support member through said inner edge, into said air gap and be released into said tubular housing through said at least one dispensing opening.

2. A method of making a condiment dispenser comprising:

forming a tubular housing having first and second end portions, said first end portion having an inwardly extending flange;

forming a support member having first and second opposing surfaces, raw inner and outer edges and a through opening defined by said inner edge;

forming a web containing a plurality of seal members, said seal members connected to one another in the web by ear portions;

aligning one of said seal members with said support member;

attaching the aligned seal member to said first surface of said support member;

severing the attached seal member from said web;

forming a perforate member with at least one dispensing opening;

attaching said perforate member to said second surface of said support member thereby resulting in an air gap between said perforate member and said seal member;

positioning said support member such that the outer edge of said support member is adjacent an inside surface of said tubular housing; and applying a bead of hot melt adhesive proximate said support member outer edge and said tubular housing for sealing said support member outer edge;

wherein said support member inner edge is adapted such that any steam created within said support member during the application of said hot melt adhesive to said support member outer edge may migrate out of said support member through said inner edge, into said air gap and be released into said tubular housing through said at least one dispensing opening.

* * * * *